United States Patent [19]

Sakashita et al.

[11] Patent Number: 5,745,970
[45] Date of Patent: May 5, 1998

[54] DISC DRIVE DEVICE CHUCKING MAGNET MAGNETIZING METHOD AND MAGNETIZING APPARATUS

[75] Inventors: Hiroshi Sakashita; Masayuki Katagiri, both of Nagano, Japan

[73] Assignee: Sankyo Seiki Mfg. Co., Ltd., Nagano-ken, Japan

[21] Appl. No.: 517,038

[22] Filed: Aug. 21, 1995

[30] Foreign Application Priority Data

Aug. 22, 1994 [JP] Japan .................................. 6-220935

[51] Int. Cl.$^6$ ................................................ B23Q 17/00
[52] U.S. Cl. .................... 29/407.05; 29/559; 29/603.3; 335/284; 361/143
[58] Field of Search ................................ 29/559, 407.01, 29/407.05, 603.03; 361/143; 335/284

[56] References Cited

U.S. PATENT DOCUMENTS 5,072,321  12/1991  Kanai et al. .

Primary Examiner—David P. Bryant
Attorney, Agent, or Firm—McAulay Fisher Nissen Goldberg & Kiel, LLP

[57] ABSTRACT

A chucking magnet magnetizing method and magnetizing apparatus with which it is possible to carry out magnetization so that the magnetic attraction forces of chucking magnets are uniform even when there is some dispersion among products in the difference in height between the hub support and the chucking magnet are disclosed. Magnetization of a chucking magnet is carried out with the magnetizing power of a magnetizing device varied according to the difference in height between a hub support and the chucking magnet. There are provided a dimension measuring device for measuring the difference in height between the hub support and the chucking magnet and a varying device for varying the magnetization power from the magnetizing device based on measured values form the measuring device. A distance varying device for varying the distance between the chucking magnet and the magnetizing device based on measured values from the dimension measuring device and voltage controlling device for varying the magnetizing power by controlling the voltage of a magnetizing power supply are described.

7 Claims, 4 Drawing Sheets

DISC DRIVE DEVICE CHUCKING MAGNET MAGNETIZING METHOD AND MAGNETIZING APPARATUS

BACKGROUND OF THE INVENTION a) Field of the Invention

The present invention relates to a magnetizing method and a magnetizing apparatus for a chucking magnet for attracting and holding a magnetic disc of a disc drive device.

b) Description of the Related Art

Conventionally, in a magnetic disc drive device using a magnetic disc such as a 3.5 inch floppy disc, a disc hub made of a magnetic material is provided at the center of the disc, and by this disc hub made of a magnetic material being magnetically attracted to and held on a hub support of a rotary drive device on the magnetic disc drive device side, the disc is rotationally driven. For this, a chucking magnet for magnetically attracting and holding the disc hub made of a magnetic material is provided on the hub support of the rotary drive device side.

FIG. 6 and FIG. 7 show a conventional magnetic disc drive device using a chucking magnet of this kind, and are views in which only the parts to the right side of the rotational centerline are shown. In FIG. 6 and FIG. 7, a substantially cylindrical bearing holder 8 is mounted at the center of a base plate 5. A stator core 9 is mounted on a flange portion of the bearing holder 8. The stator core 9 has a plurality of poles extending radially outward, and a drive coil 10 is wound around each of the poles. The drive coils 10 are controlled by a control circuit on the base plate 5.

Two bearings 7 are mounted on the inner surface of a central hole in the bearing holder 8. These bearings 7 and a thrust pad 6 rotatably support a rotary shaft 4. A substantially cup-shaped rotor case 3 is integrally mounted on the upper end portion of the rotary shaft 4 by way of a hub support 1 on which is placed a disc. Drive magnets 11 are mounted on the inner circumferential surface of a circumferential wall of the rotor case 3, and the inner circumferential surfaces of these drive magnets 11 face the outer circumferential surface of the stator core 9 across a suitable gap.

A ring-shaped chucking magnet 2 is attached to the central portion of the upper surface of the rotor case 3 around the hub support 1 by means of double-sided adhesive tape or the like not shown in the drawings. A slip pad or the like is affixed to the upper surface of the hub support 1 and forms a disc placement surface, and this projects slightly further in the axial direction than the upper surface (the surface facing the disc) of the chucking magnet 2 so that it is slightly higher. As a result, as shown in FIG. 7, when a disc hub 12 is placed on the hub support 1, a small gap is formed between the upper surface of the chucking magnet 2 and the lower surface of the disc hub 12.

In a magnetic disc drive device of the kind described above, the magnetic attracting force on the disc hub made of a magnetic material is affected by the gap between the upper surface of the chucking magnet and the upper surface of the hub support (that is, the lower surface of the disc hub). Consequently, when the spacing between the upper surface of the chucking magnet and the upper surface of the hub support is too large or too small, the prescribed attracting force is not obtained. Disc chucking errors occur as a result and it is not possible to attract and hold the magnetic disc stably.

Therefore, to stably attract and hold a disc hub with a constant magnetic attracting force, it is necessary to keep the gap between the upper surface of the hub support and the upper surface of the chucking magnet constant.

However, because the size of this gap is affected by the machining accuracy of the hub support and the chucking magnet, the machining accuracy of the surface of the rotor case on which the chucking magnet is mounted and the assembly accuracy of the hub support and the rotor case, it is not always constant among devices. Because of this, it is necessary to select only products in which this gap is within a fixed range. Yield is therefore poor and this results in high cost. Also, because chucking magnets are usually made by mixing a magnetic powder and a binder and rolling and then cutting this, the tolerance in the thickness dimension is as much as about ±0.1 mm and dispersion is great. However, there has been the problem that in order to reduce the tolerance further than this, it is necessary to strictly control the plate thickness by, for example, adding a lathe machining step to the above manufacturing process. The manufacturing process thus becomes complicated and the manufacturing cost becomes high.

OBJECT AND SUMMARY OF THE INVENTION

This invention has been devised to solve the above-described problems of the conventional technology, and a primary object of the invention is to provide a chucking magnet magnetizing method and a chucking magnet magnetizing apparatus with which even when there is disparity in the difference in height between the hub support and the chucking magnet among individual products, it is possible to perform magnetization so that the magnetic attracting forces of individual chucking magnetics are substantially uniform and a disc hub can be attracted and held stably.

In accordance with the present invention, a disc drive device chucking magnet magnetizing method comprises the steps of measuring a difference in height between a hub support on which a disc hub is placed and a chucking magnet for magnetically attracting the disc hub and magnetizing the chucking magnet with a magnetizing power from magnetizing means which are varied according to said difference so that attracting forces on disc hubs of individual chucking magnets are thereby made substantially uniform.

Also in accordance with the present invention, in a disc drive device chucking magnet magnetizing apparatus for magnetizing a chucking magnet of a disc drive device having a rotary shaft, a hub support on which a disc hub is placed and a chucking magnet disposed around the hub support for magnetically attracting the disc hub, the improvement comprises dimension measuring means for measuring a difference in height between the hub support and the chucking magnet and varying means for varying a magnetized power from magnetizing means based on measured values provided by the dimension measuring means.

For a better understanding of the present invention, reference is made to the following description and accompanying drawings while the scope of the invention will be pointed out in the appended claims.

DETAILED DESCRIPTION OF THE PREFERRED EMBODIMENTS

An embodiment of a chucking magnet magnetizing apparatus according to the invention will now be described using the drawings. The basic constitution of the disc drive device is the same as that of the conventional example described above, and a description thereof will therefore be omitted.

Figure 1:
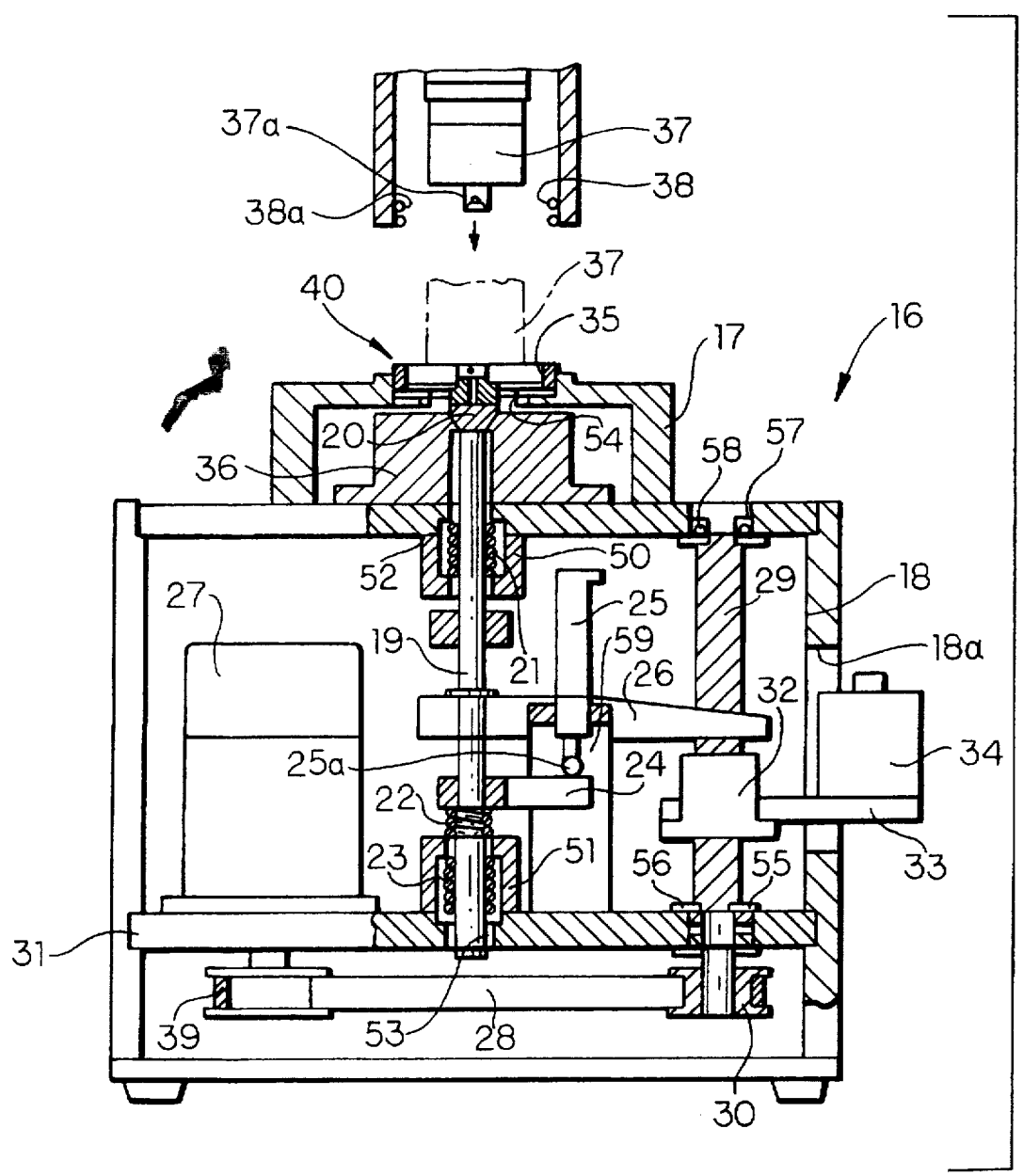
FIG. 1 is a sectional view of an embodiment of a magnetizing apparatus according to the invention.
Figure 2:
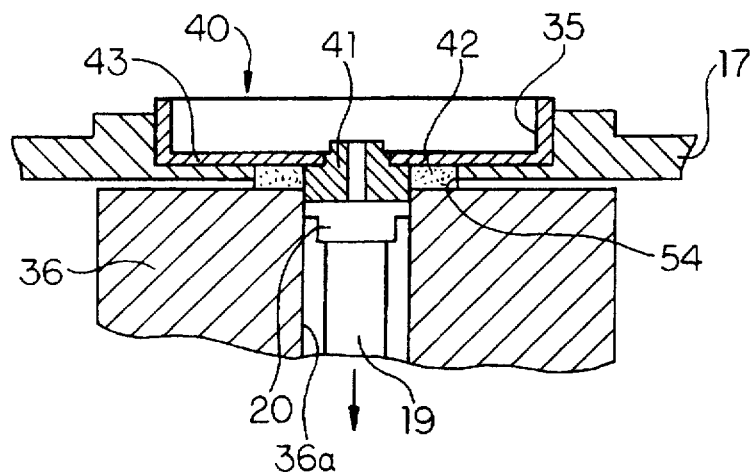
FIG. 2 is a sectional view of a main part of the same embodiment.
Figure 3:
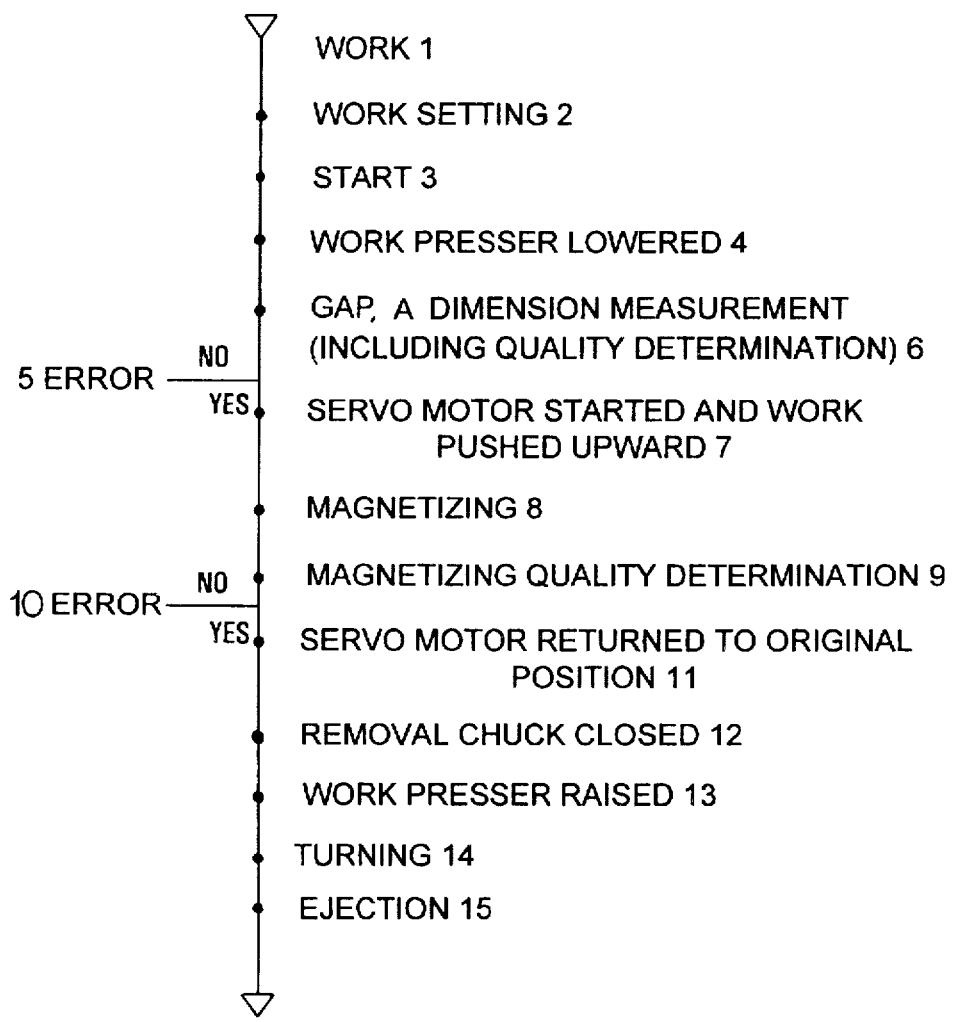
FIG. 3 is a process chart showing a magnetizing process according to the invention.

In FIG. 1 and FIG. 2, a chucking magnet magnetizing apparatus 16 is made up of a base body 18 in which are housed a servo motor and the like, which will be further discussed below, and a work table 17 integrally mounted on top of the base body 18. A central hole 52 is provided in a central portion of the upper surface of the base body 18, and a sleeve 50 is formed extending downward from this central hole 52. A support plate 31 parallel with the bottom surface of the base body 18 is mounted in the lower part of the inside of the base body 18. A central hole 53 concentric with the central hole 52 is formed in a central portion of this support plate 31, and a sleeve 51 is formed extending upward from this central hole 53. A pushing rod 19 is fitted passing from the central hole 52 to the central hole 53.

The upper end portion of the pushing rod 19 faces a central hole 54 formed in the upper surface of the work table 17. A plate 26 extending to the right side in the horizontal direction in FIG. 1 is mounted on a vertically central portion of the pushing rod 19 integrally with the pushing rod 19. The plate 26 is movable vertically integrally with the pushing rod 19, and its movement in the left-right direction is restricted by a support member 59 mounted vertically on the support plate 31. An abutting member 24 is mounted integrally with the pushing rod 19 in parallel with the plate 26 nearer to the lower end of the pushing rod 19 than the portion thereof on which the plate 26 is mounted. This abutting member 24 is also mounted movably vertically together with movement of the pushing rod 19, and a detecting part 25a of a magne-scale 25 abuts with one end portion of the abutting member 24. The magne-scale 25 is fixed to the support member 59, and, by detecting the amount of movement of the abutting member 24, detects the amount of movement of the pushing rod 19. Information on this detected amount of movement is supplied to a control circuit, not shown in the drawings, of the magnetizing apparatus.

The detecting means is not limited to a magne-scale, and as long as it can detect the amount of movement of the pushing member, an optical or mechanical or other suitable type of detecting means may be used.

A spring 22 is mounted between the lower surface of the abutting member 24 and the upper surface of the sleeve 51 formed at the center of the support plate 31. The thrust load of the pushing rod 19 is supported and the pushing rod 19 is supported movably in the vertical direction by this spring 22 and a bearing 21 mounted inside the sleeve 50 and a bearing 23 mounted inside the sleeve 51.

A servo motor 27 is mounted on the left side in FIG. 1 of the upper surface of the support plate 31. The output shaft of the servo motor 27 passes through a through hole in the support plate 31 and projects downward thereof. A pulley 39 is mounted on this output shaft of the servo motor 27. The servo motor 27 is connected to the control circuit (not shown in the drawings) of the chucking magnet magnetizing apparatus 16 and is controlled by this control circuit.

A through hole 55 is formed in the right side portion in FIG. 1 of the support plate 31, and a through hole 57 concentric with this through hole 55 is formed in the upper surface of the base body 18. Bearings 56 and 58 are mounted on the inner circumferential surfaces of these through holes 55 and 57 respectively, and a ball screw 29 is rotatably supported by these bearings 56 and 58. The lower end portion of this ball screw 29 passes through the through hole 55 in the support plate 31 and projects from the underside of the support plate 31, and a pulley 30 is mounted on this lower end portion. A timing belt 28 is fitted around this pulley 30 and the pulley 39 of the servo motor 27, and the drive of the servo motor 27 is transmitted to the ball screw 29 by way of this timing belt 28.

A ball nut 32 is screwed on the ball screw 29, and the ball nut 32 is movable vertically along with rotation of the ball screw 29. The ball nut 32 is substantially cylindrical, and a flange portion of greater diameter than the upper end portion is formed on the lower end portion thereof. A weight support plate 33 extending horizontally to the right in FIG. 1 is fixed to this flange portion. An end portion of the weight support plate 33 projects from a window hole 18a formed in a side surface of the base body 18, and by this end portion being positionally restricted in the left-hand direction by the sides of the window hole 18a, the ball nut 32 and the weight support plate 33 are prevented from rotating. A weight 34 is mounted on the upper surface of the end portion of the weight support plate 33 projecting through the window hole 18a. The weight 34 has a suitable weight, and the load of this weight 34 prevents the ball nut 32 itself from rotating and makes it possible for the ball nut 32 to move precisely.

An end portion of the plate 26 is positioned above the ball nut 32 with a suitable gap therebetween. When the ball nut 32 moves upward, the upper surface of the ball nut 32 abuts with the lower surface of the plate 26, the plate 26 moves upward and the pushing rod 19 moves upward integrally therewith.

Figure 6:
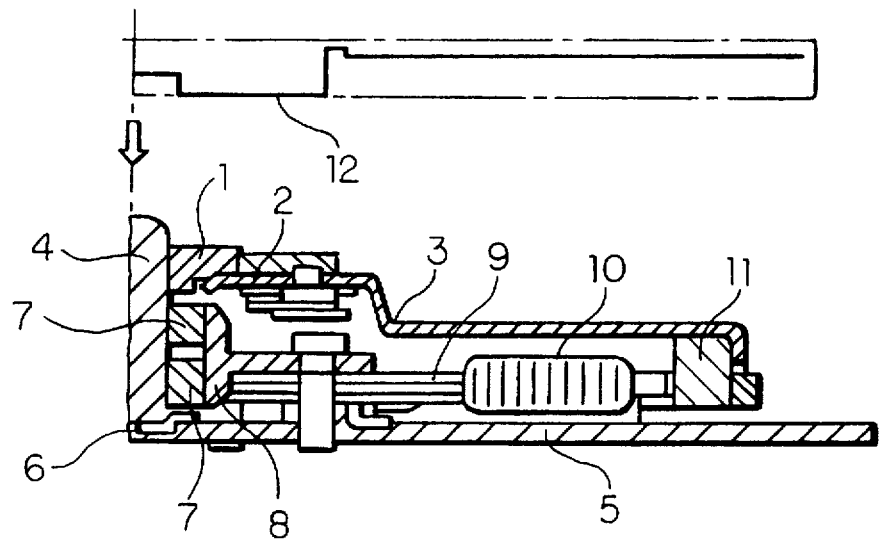
FIG. 6 is a sectional view showing an example of a conventional magnetic disc drive device.
Figure 7:
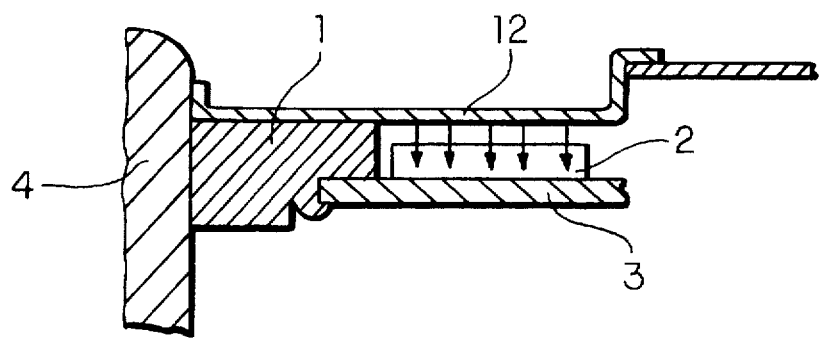
FIG. 7 is a sectional view showing a main part of the same conventional example.

As shown in FIG. 2, a receiving part 35 for holding a work 40 is formed in the upper surface of the work table 17 of the chucking magnet magnetizing apparatus 16. The work 40 is part of the rotor of the above-described disc drive device shown in FIG. 6 and comprises a hub support 41 mounted on a rotor case 43 and a chucking magnet 42 mounted around this hub support 41.

The receiving part 35 is formed in a bottomed concave shape, and the central hole 54 is formed at the center thereof. The central hole 54 is of a diameter the same as or slightly larger than the outer diameter of the chucking magnet of the work 40. As a result, when the work 40 is fitted in the receiving part 35, the hub support 41 of the work 40 and the chucking magnet 42 project downward through the central hole 54.

A magnetizing head 36 constituting magnetizing means of the invention is disposed inside the work table 17. The magnetizing head itself is known technology and a detailed description thereof will be omitted. A through hole 36a concentric with the central hole 52 in the upper surface of the base body 18 shown in FIG. 1 is formed through the center of the magnetizing head 36, and the upper end of the pushing rod 19 passes through this through hole 36a. A pushing member 20 is attached to the upper end of the pushing rod 19. The pushing member 20 is substantially cylindrical, and the diameter of the pushing member 20 is substantially the same size as the diameter of the upper surface of the hub support 41 of the work 40. The magne-scale 25 is calibrated to zero when the upper surface of pushing member 20 is flush with the upper surface of the magnetizing head 36. Thus, the magne-scale 25 can measure any movement of the upper surface of the pushing member 20 relative to the magnetizing head 36. When no work 40 has been fitted, the upper surface of the pushing member 20 is positioned in a higher position than the upper surface of the magnetizing head 36. The magnetizing head 36 is controlled by the control circuit, not shown in the drawings, of the magnetizing apparatus.

As shown in FIG. 1, a work presser 37 and a removal chuck 38 are disposed above the work table 17. The work presser 37 and the removal chuck 38 are so mounted that they can be moved up and down by driving means not shown in the drawings; a presser member 37a for pushing the work 40 is attached to the lower end portion of the work presser 37, and engaging means 38a for gripping the work 40 is mounted on the lower end portion of the removal chuck 38.

Next, the operation and the chucking magnet magnetizing method of the magnetizing apparatus thus constructed will be described using FIG. 1 through FIG. 5.

First, the work 40 is set in the receiving part 35 as shown in FIG. 1. In this state, as shown in FIG. 1, the hub support 41 of the work 40 is in abutment with the upper surface of the pushing member 20. Because the pushing rod 19 to which the pushing member 20 is attached is urged upward in the bearings 21 and 23 by the spring 22, the rotor case, that is the work 40, is held by this urging force in a state wherein it floats slightly above the receiving part 35.

Next, the work presser 37, which had been standing by in the position shown with solid lines, is lowered into the position shown with broken lines in FIG. 1. The work presser 37 is lowered until the upper surface of the chucking magnet 42 (the bottom surface thereof in FIG. 1 and FIG. 2) abuts with the upper surface of the magnetizing head 36 and is positionally restricted thereby. The work presser 37 stops when the upper surface of the chucking magnet 42 abuts with the upper surface of the magnetizing head 36, and the work 40 is positioned and held in the receiving part 35 against the urging force of the spring 22 (see FIG. 2). In this state, because the upper surface of the pushing member 20 is in abutment with the upper surface (the bottom surface in FIG. 2) of the hub support 41 of the work 40, the pushing member 20 and the pushing rod 19 move downward by the amount by which the hub support 41 projects.

Along with the downward movement of the pushing rod 19, the abutting member 24 attached to the pushing rod 19 also moves downward, and this movement amount of this downward movement of the abutting member 24 is detected by the magne-scale 25. This detected movement amount includes the difference in height between the upper surface of the hub support 41 and the upper surface of the chucking magnet 42, and is inputted into the magnetizing apparatus control circuit.

Here, when the detected difference in height between the upper surface of the hub support 41 and the upper surface of the chucking magnet 42 is greater than a fixed dimension, the work cannot be used as a product, and because correcting this individually makes the process complicated, a tolerance range may be set in advance and works outside this tolerance range may be discarded as defective.

When the difference in height between the upper surface of the hub support 41 and the upper surface of the chucking magnet 42 is supplied to the magnetizing apparatus control circuit, this information is taken in and processed, and a rotation amount of the servo motor 27 corresponding to the difference in height between the upper surface of the hub support 41 and the upper surface of the chucking magnet 42 is determined. The control circuit then rotates the servo motor 27 according to this rotation amount. This rotation is transmitted by the timing belt 28 to the pulley 30, and the ball screw 29 is thereby rotated. This rotation of the ball screw 29 causes the ball nut 32 to rise, and the upper surface of the ball nut 32 abuts with the bottom surface of the plate 26 and pushes up the plate 26. Because the plate 26 is formed integrally with the pushing rod 19, the pushing rod 19 also moves upward together with the ascent of the plate 26. When the pushing rod 19 moves upward, the hub support 41 is pushed upward by the pushing member 20, and the whole work 40 also moves upward against the pushing force of the work presser 37. As a result, the chucking magnet 42 also ascends, and a gap corresponding to the difference in height between the upper surface of the hub support 41 and the upper surface of the chucking magnet 42 is formed between the lower surface of the chucking magnet 42 and the upper surface of the magnetizing head 36. The setting of the value of this gap will be further discussed below.

The rotation amount of the servo motor 27 is determined by calculating and adding the rotation amount until the ball nut 32 abuts with the bottom surface of the plate 26 and the rotation amount of the distance through which the plate 26 actually rises (i.e., the distance through which the chucking magnet 42 moves away from the magnetizing head 36) in correspondence with the difference in height between the upper surface of the hub support 41 and the upper surface of the chucking magnet 42.

Then, pulse current is passed through the magnetizing head 36 from the magnetizing apparatus control circuit and magnetizing of the chucking magnet 42 is carried out. At this time, the same voltage is used for the magnetizing voltage impressed on the magnetizing head 36, but it is possible to carry out magnetization of the chucking magnet 42 with a magnetizing power corresponding to the difference in height between the hub support 41 and the chucking magnet 42 by varying the gap by which the chucking magnet 42 is apart from the magnetizing head 36. As necessary, as well as varying the gap by which the chucking magnet 42 is as part from the magnetizing head 36, the magnetizing voltage impressed on the magnetizing head 36 may also be changed.

Also, after current is passed through the magnetizing head, the magnetization of the chucking magnet may be checked and poorly magnetizing chucking magnets discarded; in this way, the magnetization states of individual chucking magnets can be kept good.

After magnetization of the chucking magnet 42 is finished, the servo motor 27 is reversed and the ball nut 32, the plate 26 and the pushing rod 19 are returned to their original positions. The work 40 is then gripped by the removal chuck 38, the removal chuck 38 is raised and turned together with the work presser 37, and chucking magnets, having been given the prescribed magnetization, are removed to the next step; in this way, the chain of processes is completed.

When the magnetization state is determined, poorly magnetized pieces of work which it is judged cannot be used as products are discarded by the removal chuck 38 without having moved on to the next step.

Next, an example of a way of setting a gap between the magnetizing head 36 and the chucking magnet 42 corresponding to the gap between the upper surface of the hub support 41 and the upper surface of the chucking magnet 42 (hereinafter referred to as "dimension A") will be described.

Figures 4, 5:
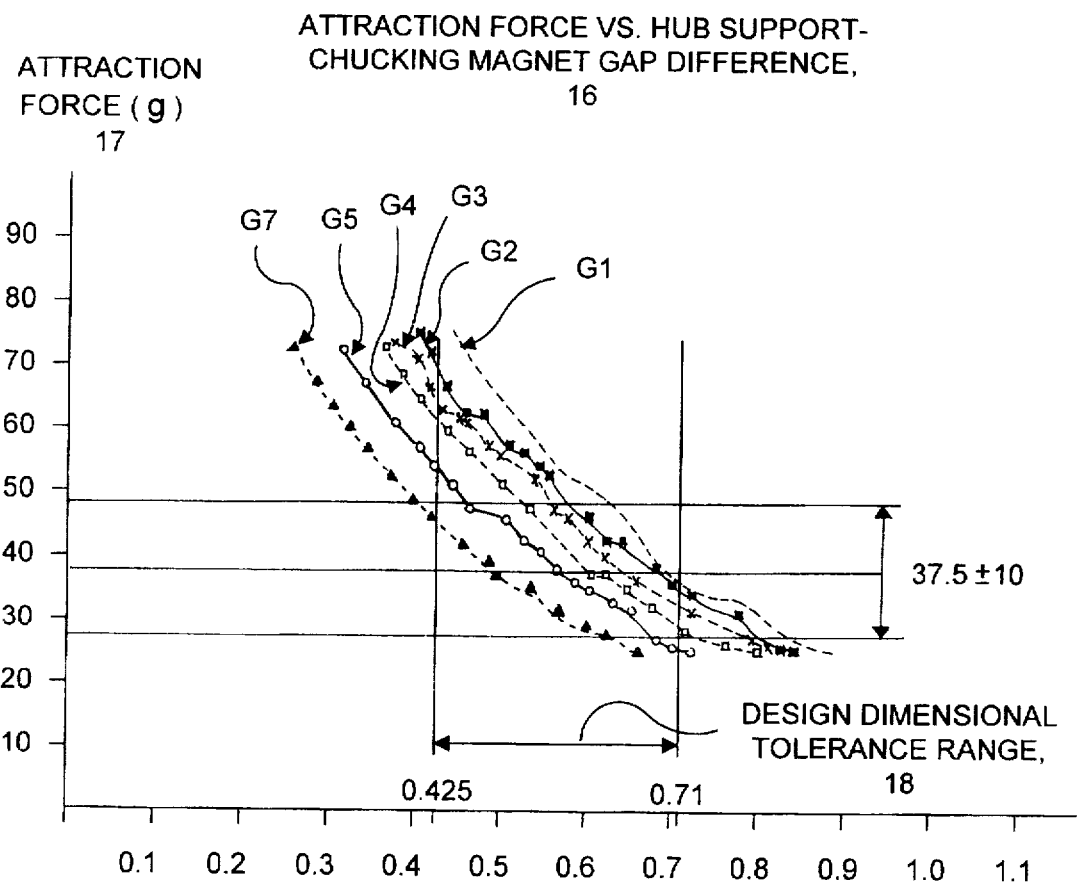
FIG. 4 is a graph showing relationships between the attraction force and the gap between the upper surface of the hub support and the upper surface of the chucking magnet for predetermined gaps between the magnetizing head and the chucking magnet.
FIG. 5 is a sectional view showing tolerances of main parts of a disc drive device in the embodiment.

FIG. 5 shows as an example dimensional tolerances in the manufacture of a disc drive device. In FIG. 5, A is the gap between the upper surface of the hub support 41 and the upper surface of the chucking magnet 42. The dimensional tolerance from the bottom surface of the hub support 41 to the upper surface of the same will be supposed to be ±Δa(±0.015 mm), the dimensional tolerance of the slip pad on the upper surface of the hub support to be ±Δb(+10 μm,−5 μm), the assembly tolerance of the rotor case 43 and the hub support 41 to be ±Δc(±0.03 mm), the dimensional tolerance of the adhesive tape to be ±Δd(±0.05 mm) and the dimensional tolerance of the chucking magnet to be ±Δe(±0.04 mm)

From the above-mentioned dimensional tolerances of the different parts, the dimensional tolerance A is found to have a maximum value (max) of Δa+Δb−Δc−Δd−Δe (0.71 mm) and a minimum value (min) of −Δa−Δb+Δc+Δd+Δe (0.425 mm)

FIG. 4 is a graph showing relationships between the magnetic attraction force and the gap between the hub support upper surface and the chucking magnet upper surface for certain predetermined gaps ($G_1$ through $G_7$) between the magnetizing head and the chucking magnet in cases where magnetizing was carried out with conditions of a condenser capacity of 400 μF, 900V.

In FIG. 4, $G_1$, shows the relationship between the gap A and the attraction force when the gap between the chucking magnet and the magnetizing head was set to 0.1 mm, $G_2$ when it was 0.2 mm; $G_3$ when it was 0.3 mm, $G_4$ when it was 0.4 mm, $G_5$ when it was 0.5 mm and $G_7$ when it was 0.7 mm.

As is clear from FIG. 4, there is the relationship that when the spacing between the chucking magnet and the magnetizing head is narrow, the attraction force is correspondingly large.

The minimum value 0.425 mm and the maximum value 0.71 mm of the difference in height between the hub support and the chucking magnet obtained as described above in the above-mentioned example of FIG. 5 are set in FIG. 4 as an example. When it is supposed that from the specification of the device, the magnetic attraction force is set in the range 37.5 g±10 g, only the range enclosed by the rectangle in FIG. 4 can be used as disc drive devices, and devices outside this range are off-specification.

To adjust the gap between the chucking magnet and the magnetizing head in correspondence with the difference in height between the hub support and the chucking magnet based on the above-mentioned example conditions, for example when the measured dimension A is 0.5 mm, the curves within the specifications are $G_5$ and $G_7$, and since of these the one closest to the prescribed magnetic attraction force 37.5 g is $G_7$, in this case the gap between the chucking magnet and the magnetizing head should be 0.7 mm. Similarly, for example when dimension A is 0.6 mm, $G_2$ through $G_7$ are within the specifications and since among these that of which the attraction force is the closest to 37.5 g, is $G_4$, the gap between the chucking magnet and the magnetizing head should be set to 0.4 mm.

The conditions such as the range of dimensional tolerance and the range of magnetic attraction force mentioned above are not limited to the values given in this embodiment and may be suitably selected according to the type of the disc drive device, and correlation coefficients comprising predetermined values for different disc drive devices may be stored in advance in a program memory part in the control part of the magnetizing apparatus.

As described above, because according to the invention of this application, the difference in height between the disc placement surface of the hub support 41 and the surface of the chucking magnet 42 facing the disc is measured and the chucking magnet 42 is magnetized with the magnetizing power being varied according to this difference, even when there are individual differences in the difference in height between the hub support and the chucking magnet magnetization can be carried out in correspondence with the respective difference in heights and as a result it is possible to obtain a stable attraction force without strictly controlling the dimensional tolerances of the chucking magnet and the hub support, steps such as sorting according to dimensions become unnecessary and it is possible to manufacture easily and costs can be reduced.

Also, since one can obtain a desired attraction force when the type of device is changed by only changing the program of the apparatus, the apparatus can be standardized and there are no arrangement interchanging losses and the like and reductions in assembly costs can be achieved.

Furthermore, the attraction forces exerted on the disc hubs by individual chucking magnets can be made substantially uniform, and it is possible to prevent disc chucking errors.

Next, another embodiment of the invention will be described.

The embodiment described above had distance varying means comprising a ball nut and a ball screw, but instead of using this distance varying means, voltage control means may be provided and the voltage of the magnetizing power supply of the magnetizing head may be controlled.

When magnetizing is carried out by a magnetizing apparatus wherein the magnetizing power supply voltage of the magnetizing head is varied, first the gap between the hub support and the chucking magnet is measured as in the embodiment described above. Then a magnetizing power corresponding to this measured value is calculated, and based on the result of this calculation, the magnetizing power supply voltage, or more specifically the charging voltage of a capacitor of the magnetizer, is controlled by voltage controlling means and the chucking magnet magnetizing power is varied according to the gap between the hub support and the chucking magnet.

With this other embodiment of the invention also, because it is possible to vary the chucking magnet magnetizing power according to the gap between the hub support and the chucking magnet, the same effects as those of the embodiment shown in FIG. 1 through FIG. 5 can be obtained.

In this embodiment, after the gap between the hub support and the chucking magnet is measured, calculation using this measured value may be carried out and based on this calculation result, the work presser may be raised and the work may thereby be lifted by the urging force of the spring 22 and a prescribed gap formed and magnetizing carried out in this state.

Also, when, without performing any calculation, the work is raised by a predetermined fixed amount, because the gap between the magnetizing head and the chucking magnet becomes constant, magnetization of the chucking magnet may be carried out by impressing on the magnetizing head a voltage controlled to correspond to the gap between the hub support and the chucking magnet on the magnetizing head after the predetermined gap is formed.

In the embodiment described above, a magnetic disc as a disc having a disc hub made of a magnetic material at the center of the disc was shown; however, a disc used for this invention is not limited to a magnetic disc and may be an optical disc or an opto-magnetic disc.

According to the invention, because the difference in height between the hub support and the chucking magnet is measured and magnetization of the chucking magnet is carried out with the magnetizing power varied according to that difference, even if the difference in height between the hub support and the chucking magnet differs among individual devices it becomes possible to magnetize with the magnetizing power varied according to the respective difference in height, a stable attraction force can be obtained without strictly controlling the dimensional tolerances of the chucking magnet and the hub support. Further, because steps such as sorting according to the dimension between the disc placement surface of the hub support and the surface of the chucking magnet facing the disc become unnecessary, it is possible to manufacture easily and costs can be reduced.

Also, because a desired attraction force can be obtained by means of the program of the apparatus irrespective of changes in the type of device, standardization is possible and there are no losses of arrangement interchanging or the like and reductions in assembly costs can be achieved.

Still further, because it is possible to make the attracting force exerted on the disc hub by individual chucking magnets substantially uniform all-around, disc chucking errors can be prevented.

While the foregoing description and drawings represent the preferred embodiments of the present invention, it will be obvious to those skilled in the art that various changes and modifications may be made therein without departing from the true spirit and scope of the present invention.

What is claimed is:

1. A disc drive device chucking magnet magnetizing method comprising the steps of:

measuring a difference in height between a surface of a hub support on which a disc hub is placed and a surface of a chucking magnet which is mounted on said hub support for magnetically attracting the disc hub; and magnetizing the chucking magnet with a magnetizing power from a magnetizing means, where said magnetizing power is varied according to said difference so that attracting forces on said disc hub are substantially uniform.

2. A magnetizing method according to claim 1, further comprising the step of placing a gap between the chucking magnet and the magnetizing means to vary said magnetizing power.

3. A magnetizing method according to claim 1, further comprising the steps of maintaining a predetermined gap between the chucking magnet and the magnetizing means and varying the magnetizing power of the magnetizing means by varying a magnetizing voltage applied to the magnetizing means.

4. A disc drive device chucking magnet magnetizing apparatus for magnetizing a chucking magnet of a disc drive device having a rotary shaft, a hub support on which a disc hub is placed and a chucking magnet which is disposed around said hub support for magnetically attracting the disc hub, said magnetizing apparatus comprising:

dimension measuring means for measuring a difference in height between a surface of the hub support and a surface of the chucking magnet; and varying means for varying a magnetizing power of a magnetizing means based on measured values provided by the dimension measuring means.

5. A disc drive device chucking magnet magnetizing apparatus according to claim 4, wherein said varying means varies the distance between the chucking magnet and the magnetizing means based on measured values provided by the dimension measuring means.

6. A magnetizing apparatus according to claim 5, further comprising a memory part which stores a correlation coefficient that correlates (i) the difference in height between the hub support and the chucking magnet and (ii) a gap between the magnetizing means and the chucking magnet to allow the varying means to vary the distance between the chucking magnet and the magnetizing means based on the correlation coefficient.

7. A chucking magnet magnetizing apparatus according to claim 4, wherein said varying means varies the magnetizing power of the magnetizing means by controlling a voltage of a power supply based on measured values provided by said dimension measuring means.

* * * * *